United States Patent [19]
Kanda et al.

[11] Patent Number: 6,048,030
[45] Date of Patent: Apr. 11, 2000

[54] SEAT SLIDING APPARATUS

[75] Inventors: Yoshihiro Kanda; Hiroshi Matsuura, both of Kosai, Japan

[73] Assignee: Fujikoko Kabushiki Kaisha, Chuou-Ku, Japan

[21] Appl. No.: 09/075,902

[22] Filed: May 11, 1998

[30] Foreign Application Priority Data

May 13, 1997 [JP] Japan ................................. 9-122497

[51] Int. Cl.[7] ........................................ A47C 1/02
[52] U.S. Cl. ................... 297/341; 297/378.1; 297/344.1
[58] Field of Search .................................. 297/341, 340, 297/378.1, 344.1; 248/424, 429, 430

[56] References Cited

U.S. PATENT DOCUMENTS

| | | | |
|---|---|---|---|
| 5,076,529 | 12/1991 | Dove et al. ............................. | 248/429 |
| 5,100,092 | 3/1992 | Sovis ...................................... | 248/429 |
| 5,531,503 | 7/1996 | Hughes ............................. | 297/378.1 X |
| 5,567,013 | 10/1996 | Chang .............................. | 297/344.1 X |
| 5,597,206 | 1/1997 | Ainsworth et al. .............. | 297/344.1 X |
| 5,855,413 | 1/1999 | Couasnon et al. ................ | 297/378.1 X |

Primary Examiner—Peter M. Cuomo
Assistant Examiner—Stephen Vu
Attorney, Agent, or Firm—Howard & Howard

[57] ABSTRACT

A seat sliding apparatus is constructed of a lower rail for mounting to a vehicle floor, an upper rail slidably received on the lower rail, a memory mechanism section, a lock member for locking the upper rail to the lower rail and a walk-in mechanism section for locking and unlocking movement of a vehicle seat in a forward-and-backward direction through operation of the memory mechanism section and the lock member. The memory mechanism section is assembled to at least one substrate so as to a unit.

3 Claims, 15 Drawing Sheets

SEAT SLIDING APPARATUS

BACKGROUND OF THE INVENTION

1. Field of the Invention

The present invention relates to a seat sliding apparatus for a vehicle seat having a walk-in mechanism.

2. Description of the Related Arts

In this kind of a seat sliding apparatus, a vehicle seat having a seat back, which can fold in a forward-and-backward direction, is mounted to an upper rail. The upper rail is slidably fitted into a lower rail fixed to a vehicle floor.

When the seat back is folded forward, a lock plate which obstructs the movement of the vehicle seat in the forward-and-backward direction is released by actuation of a walk-in mechanism, namely, the vehicle seat is moved to an unlocked position, and the vehicle seat is moved forward by force of a spring.

In addition, in order to prevent the lock plate from returning to the locked position at the time when the vehicle seat is moved forward, a memory mechanism section having an operation lever and a memory bracket is provided.

The operation lever is rotatably mounted to the upper rail by an axis fixing pin and a force is applied to the operation lever by a torsional spring and a draft spring installed between the upper rail and a lock pin of the lock plate so that the operation lever is biased to rotate in a clockwise direction.

When the seat back is folded forward, the operation lever is rotated by actuation of the walk-in mechanism in the counterclockwise direction against the spring force of the draft spring and presses down the lock plate. As a result, the locking portion of the lock plate is released and the vehicle seat is in an unlocked position in which it can move in the forward-and backward direction.

In addition, the memory bracket is rotatably mounted to the upper rail by an axis fixing pin and a force is applied to the memory bracket by a spring so that the memory bracket is biased in a counterclockwise direction. Thus, the operation lever and the memory bracket are biased to rotate in opposite directions.

When the seat section is moved from the forward moved position to a prescribed backed position, a memory holding pin, which is pushed through a slanted slide hole provided in the memory bracket and a horizontal slide hole provided in the upper rail, through cooperation of the operation lever and memory bracket can maintain the lock member in the lock-released state, namely, the vehicle seat can be maintained in the unlocked state.

The above-mentioned seat sliding apparatus is arranged so that the axis fixing pins which are mounted respectively to the operation lever and memory bracket are caulked and fixed to the upper rail, and dismounting of parts occasionally occurs at the time of the caulking step, so this apparatus has a problem of dissatisfactory assembly.

SUMMARY OF THE INVENTION

The present invention has been achieved with such points in mind.

It therefore is an object of the present invention to provide a seat sliding apparatus whose assembling is improved.

To achieve the object, according to a first aspect of the present invention, there is provided a seat sliding apparatus, comprising: a lower rail to be mounted to a vehicle floor; an upper rail which slides on the lower rail; a memory mechanism section; a lock member locking the upper rail to the lower rail; and a walk-in mechanism section for locking and unlocking movement of a seat section in a forward-and-backward direction through the memory mechanism section and the lock member, wherein the memory mechanism section is assembled to at least one substrate so as to be united.

According to a second aspect of the present invention, as it depends from the first aspect, the memory mechanism section further comprises: an operation lever operating the lock member, the operation lever rotatably mounted with an axis fixing pin to the substrate on the side of the upper rail; a memory bracket holding the lock member in the unlocked state, the memory bracket rotatably mounted with an axis fixing pin to the substrate adjacent a free end of the operation lever and on the side of the upper rail; and a memory holding pin restraining the free end of the operation lever, the memory holding pin arranged adjacent a portion of the free end of the operation lever and the memory bracket and on the side of the upper rail, the memory holding pin inserted through a slide hole provided in the substrate and through a slide hole provided in the memory bracket, wherein the memory mechanism section is united, and the united memory mechanism section is fixed to the upper rail by the axis fixing pin of the operation lever and the axis fixing pin of the memory bracket so that the memory mechanism section can be mounted to the upper rail.

According to a third aspect of the present invention, as it depends from the second aspect, the axis fixing pin of the operation lever has a collar section for determining a position of the operation lever adjacent the side of the upper rail.

According to a fourth aspect of the present invention, as it depends from the second aspect, the axis fixing pin of the memory bracket has a collar section for determining a position of the memory bracket adjacent the side of the upper rail.

According to a fifth aspect of the present invention, as it depends from the first aspect, the memory mechanism section can be arranged in a space formed between two substrates; and the memory mechanism further comprises: an operation lever operating the lock member, the operation lever rotatably mounted with an axis fixing pin between the substrates on the side of the upper rail: a memory bracket holding the lock member in the unlocked state, the memory bracket rotatably mounted with an axis fixing pin between the substrates on a free end of the operation lever and on the side of the upper rail; and a memory holding pin restraining the free end of the operation lever, the memory holding pin arranged adjacent a polymerized portion of the free end of the operation lever and the memory bracket, the memory holding pin inserted through slide holes provided in the substrates and a slide hole provided in the memory bracket, so that the memory mechanism section is united, thereby the substrates are fixed to the upper rail so that the united memory mechanism section can be mounted to the upper rail.

According to a sixth aspect of the present invention, as it depends from the second or the fifth aspect, the slide holes provided to the substrates are formed in the direction of a line connecting the axis fixing pin of the operation lever with the axis fixing pin of the memory bracket; and the slide hole provided to the memory bracket is slanted relative to the line so that the memory holding pin can be moved to an unlocked side of the slide holes by rotary movement of the memory bracket in the clockwise direction.

According to the seat sliding apparatus in the first, second or fifth aspect, the operation lever for operating the lock member and the memory bracket for holding the lock member in the unlocked state are mounted with their axes being fixed to the substrate by the axis fixing pins, and the memory holding pin for holding the free end of the operation lever is pushed through the slide holes provided respectively in the substrate and memory bracket so that the memory mechanism section is united, and the united memory mechanism section is mounted to the upper rail, so the memory mechanism section can be assembled extremely easily, and the assembling can be improved greatly.

In addition, according to the seat sliding apparatus in the third or fourth aspect, since the collar sections for determining an axial direction are formed respectively on the axis fixing pin of the operation lever and the axis fixing pin of the memory bracket, the operation lever and memory bracket can be positioned easily.

In addition, according to the seat sliding apparatus in the sixth aspect, since the memory holding pin for locking and unlocking the operation lever is moved to the locked side and unlocked side by cooperation of the slide holes of the substrates and the slide hole of the memory bracket, the operation lever can be locked and unlocked by a simple arrangement.

These and other novel features of the present invention will become more apparent from the following detailed description and the accompanying drawings, which can be described as follows.

BRIEF DESCRIPTION OF THE ACCOMPANYING DRAWINGS

DETAILED DESCRIPTION OF THE PREFERRED EMBODIMENTS

Figure 15:
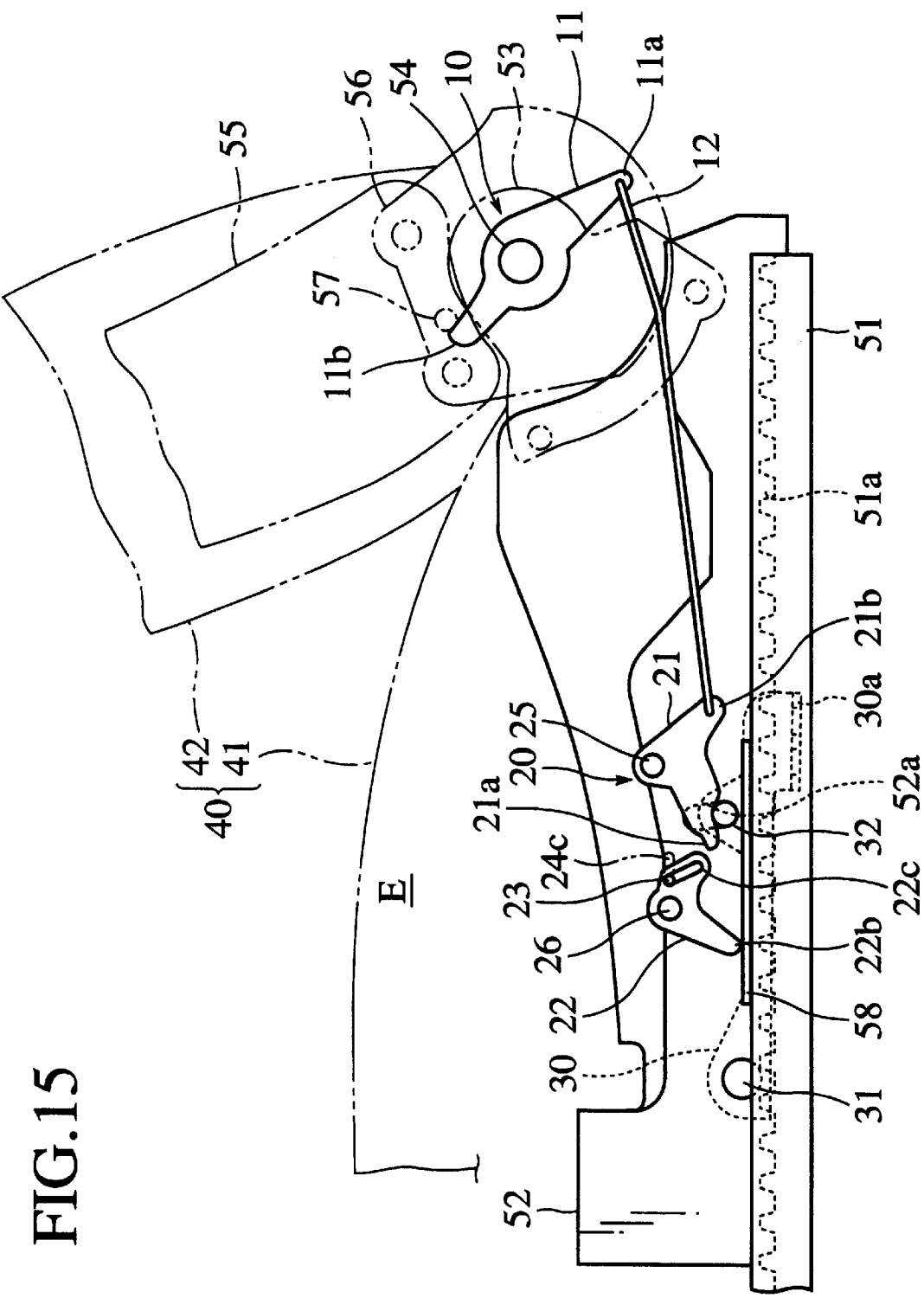
FIG. 15 is a side view of the vehicle seat of the seat sliding apparatus moved back to the vicinity of the neutral position without raising the seat back.
Figure 16:
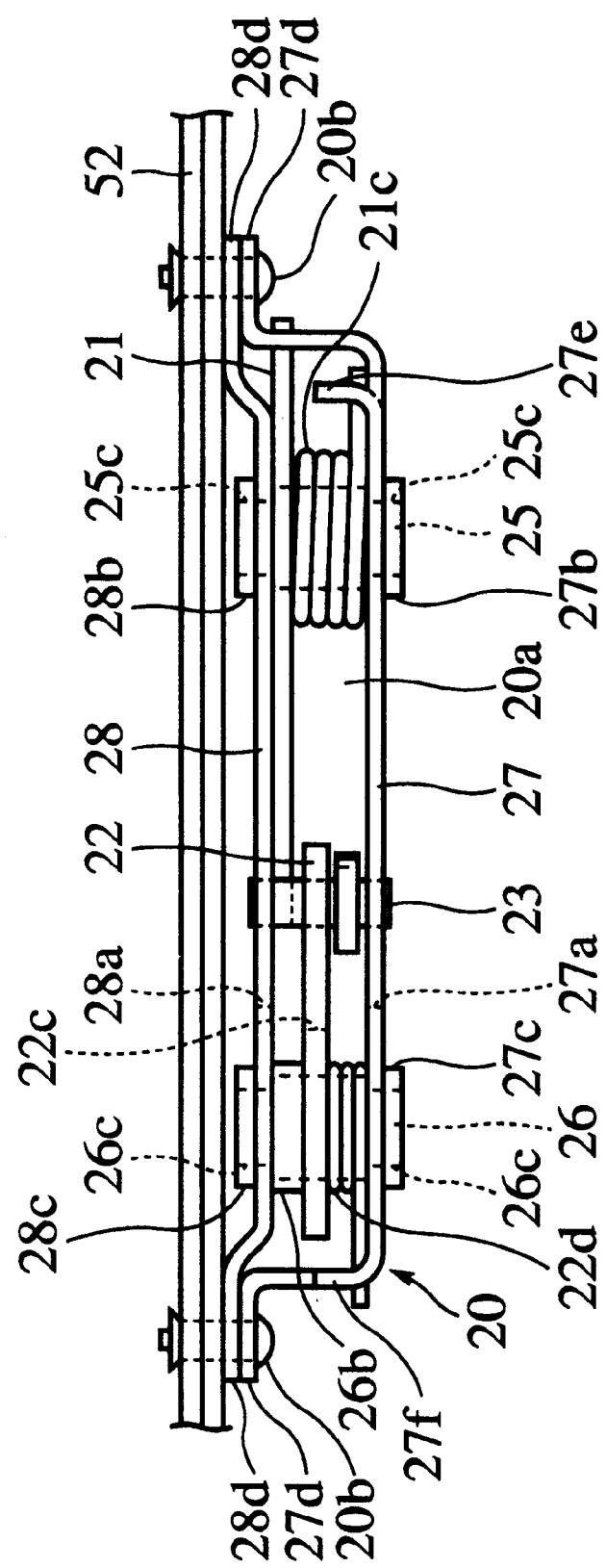
FIG. 16 is a top plan view similar to FIG. 3 showing a second embodiment of the seat sliding apparatus designed according to the present invention.

There will be detailed below the preferred embodiments of the present invention with reference to the accompanying drawings. Like members are designated by like reference characters. FIGS. 1 through 15 show a first embodiment of a seat sliding apparatus and FIG. 16 shows a second embodiment of the seat sliding apparatus.

With reference to FIGS. 1 through 16, E represents a seat sliding apparatus for a vehicle seat 40. The vehicle seat 40 includes a seat cushion 41 and a seat back 42. By actuating a walk-in mechanism section 10, movement of the vehicle seat 40 in a forward-and-backward direction is locked and unlocked by a memory mechanism section 20 and a lock plate 30. The memory mechanism section 20 is secured to a substrate 24 thus forming a unified mechanism.

A pair of right and left lower rails 51 (only one is shown) are mounted to a vehicle floor 50, and an upper rail 52 is slidably supported on each lower rail 51 so as to be able to move along a forward-and-backward direction. The upper rail 52 is mounted to seat cushion 41 of vehicle seat 40. Upper rail 52 allows vehicle seat 40 to move in the forward-and-backward direction. A force is applied to vehicle seat 40 by a spring (not shown) to urge vehicle seat 40 in the forward direction.

A plurality of engagement notches 51a are formed on lower rail 51 and equally spaced along the forward-and-backward direction. A base section of a lock plate or lock member 30 is fixed to and rotatably mounted to a front portion of upper rail 52 by a mandrel 31. A plurality, three, for example, of engagement convex portions 30a, which can be engaged with a plurality of engagement notches 51a on lower rail 51, are formed on an end of lock plate 30 opposite mandrel 31.

A lock pin 32 extends from the middle portion of lock plate 30. Lock pin 32 is received in a circular slot 52a formed in upper rail 52 with mandrel 31 of lock plate 30 centered. A draft spring 33 is mounted between lock pin 32 and an engagement hole 52b formed in upper rail 52. Draft spring 33 biases lock plate 30 to rotate in a counterclockwise direction in FIG. 4, thereby urging engagement convex portions 30a into engagement with engagement notches 51a of lower rail 51. Alternatively, instead of providing lock pin 32, a portion of lock plate 30 may be bent to extend into slot 52a. Moreover, a torsion spring may be used instead of draft spring 33.

A base plate 53 is fixed to the rearward end of upper rail 52, and an arm mounting plate 56 is rotatably supported on a mandrel 54 that extends into base plate 53. Arm mounting plate 56 includes an integral arm 55, which can be folded in the forward-and-backward direction by a reclining unit (not shown). An operation pin 57 extends into arm mounting plate 56, and arm 55 is mounted to vehicle seat section 40 on seat back 42.

Memory mechanism section 20 includes an operation lever 21 for operating lock plate 30, a memory bracket 22 for holding lock plate 30 in an unlocked position, and a memory holding pin 23 for holding a free end 21a of operation lever 21. The respective components of memory mechanism 20 are mounted to substrate 24 so as to installed integrally to upper rail 52.

Operation lever 21 is formed in a L-shaped or bell crank form, and is rotatably mounted to substrate 24 and upper rail 52 by an axis fixing pin 25. A collar section 25a, which positions operation lever 21, is formed on axis fixing pin 25.

A torsion coil spring 21c is wound around axis fixing pin 25 between operation lever 21 and substrate 24. One end of torsion coil spring 21c is engaged with an edge of operation lever 21 and the other end is engaged with an engaging section 24a formed by bending an edge of substrate 24. Torsion coil spring 21c biases operation lever 21 in a clockwise direction in FIG. 1. The biasing force of torsion coil spring 21c is selected to be less than the biasing force of draft spring 33.

Memory bracket 22 is formed in a L-shaped or bell crank form, and it is mounted to substrate 24 and upper rail 52 by an axis fixing pin 26. A collar section 26a for positioning memory bracket 22 is formed on axis fixing pin 26 adjacent upper rail 52, and a positioning spacer 26b is provided between collar section 26a and memory bracket 22. Instead of providing spacer 26b therebetween, a collar section may be formed integral to memory bracket 22 by a burring process. Both operation lever 21 and memory bracket 22 are spaced from upper rail 52 and substrate 24.

A torsion coil spring 22d is wound around axis fixing pin 26 and positioned between memory bracket 22 and the substrate 24. One end of torsion coil spring 22d is engaged with an edge of memory bracket 22 and the other end is engaged with an engagement section 24b formed by bending an edge of substrate 24. Torsion coil spring 22d biases memory bracket 22 in the counterclockwise direction in FIG. 1. The spring bias force of torsion coil spring 22d is selected to be smaller than the bias force of draft spring 33.

A slide hole 22c is formed in an end of memory bracket 22. Slide hole 22c slantingly intersects a slide hole 24c formed in substrate 24. Slide hole 24c is oriented in the direction of a line connecting axis fixing pins 25 and 26. A similar slide hole is formed in upper raid 52 (not shown). A memory holding pin 23 for contacting free end 21a of operation lever 21 extends through slide holes 22c and 24c and slides within slide holes 22c and 24c. Slide hole 22c in memory bracket 22 is oriented on a slant so that memory holding pin 23 can be moved to an unlocked position by a circular movement of the memory bracket 22 in the clockwise direction. Memory holding pin 23 is in the unlocked position when it is located on the left side of slide hole 24c of substrate 24. Memory holding pin 23 is shown on the right side of slide hole 24c and is in the locked position in FIG. 1. Memory holding pin 23 includes a collar section 23a whose diameter is larger than the diameter of slide holes 22c and 24c and that is positioned between substrate 24 and memory bracket 22.

When memory holding pin 23 moves to the right side of slide hole 24c, it moves into a moving locus of free end 21a of operation lever 21 so as to be brought into contact with free end 21a. The free end 21a of the operation lever 21 rotates to a position where an upper surface intersects perpendicularly to a plane of slide hole 24c so as to be brought into contact with memory holding pin 23. A lower surface of the free end 21a, which is slanted with respect to the plane of the slide hold 24c, is brought into contact with memory holding pin 23. When operation lever 21 rotates circularly in the clockwise direction, memory holding pin 23 obstructs the clockwise movement, and when operation lever 21 rotates in the counterclockwise direction, the lower surface of free end 21a moves memory holding pin 23 to the left side of slide hole 24c, and the circular movement is continuous.

Figure 1:
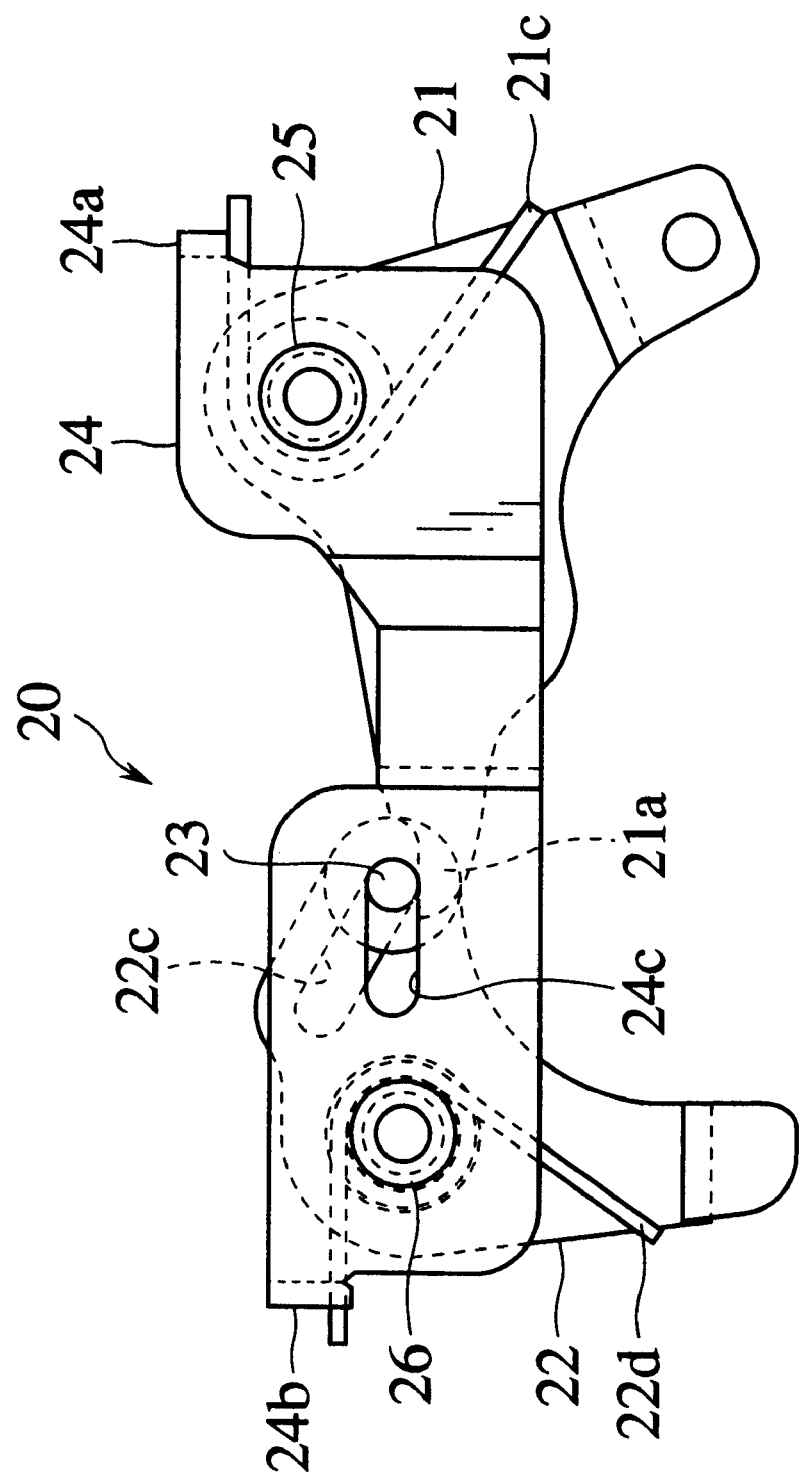
FIG. 1 is a side view of a memory mechanism section of a seat sliding apparatus designed according to a first embodiment of the present invention.
Figure 2:
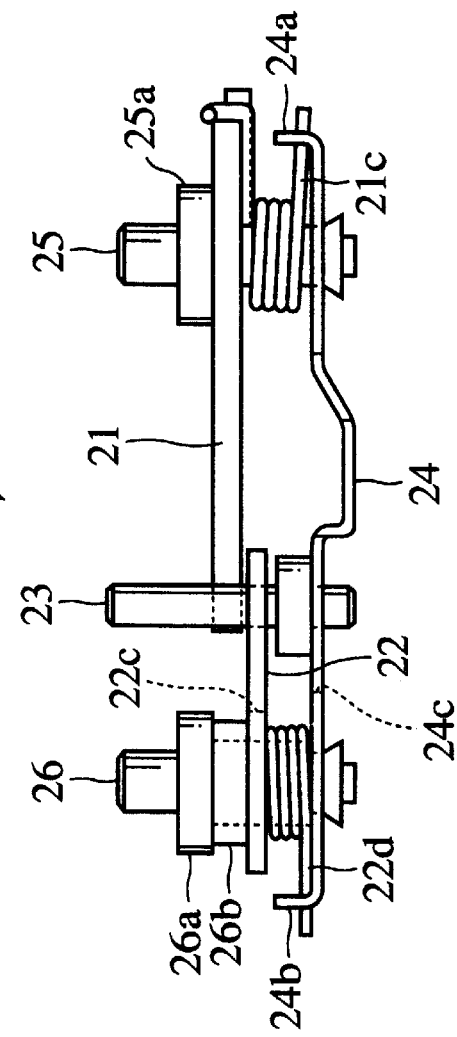
FIG. 2 is a top plan view of the memory mechanism section of the seat sliding apparatus shown in FIG. 1.
Figure 3:
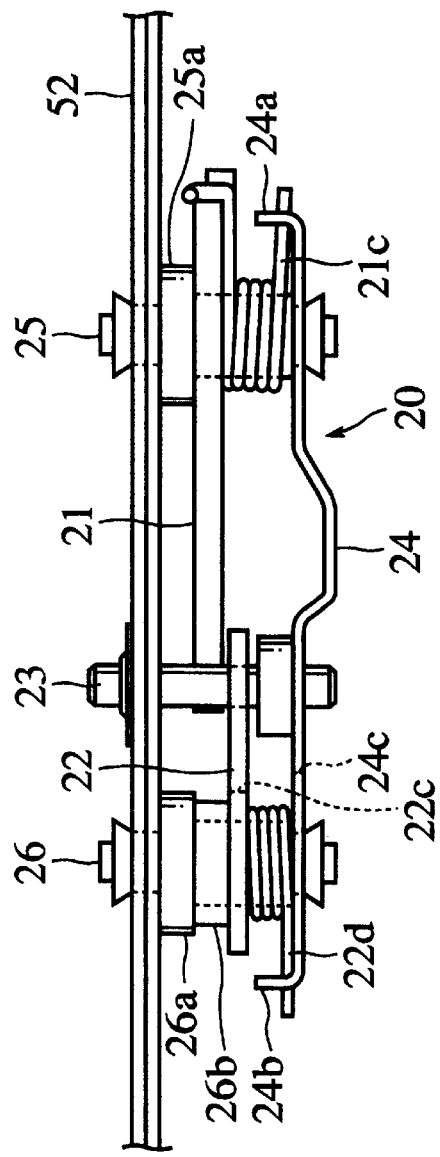
FIG. 3 is a top plan view of the memory mechanism section of the seat sliding apparatus shown in FIG. 1 mounted to an upper rail.

As mentioned above, operation lever 21 and memory bracket 22 are mounted to substrate 24 and fixed thereto by axis fixing pins 25 and 26, and torsion coil springs 21c and 22d are mounted respectively to axis fixing pins 25 and 26, and memory holding pin 23 is pushed through slide holes 22c and 24c. As a result, memory mechanism section 20 is unified as shown in FIG. 1, and the united memory mechanism section 20, as shown in FIG. 3, can be mounted to upper rail 52 by caulking and fixing axis fixing pin 25 of operation lever 21 and axis fixing pin 26 of memory bracket 22 to upper rail 52.

A memory lock releasing member 58 is mounted to the upper surface of lower rail 51, and when vehicle seat 40, which is moved forward by folding seat back 42, is moved to a pre-determined backward position, a free end 22b of memory bracket 22 is brought into contact with memory lock releasing member 58. As a result, memory bracket 22 rotates in the clockwise direction, and memory holding pin 23 moves to the left side of slide hole 24c of substrate 24 so as to be displaced from the moving locus of free end 21a of operation lever 21.

A walk-in lever 11 of walk-in mechanism 10 is mounted with its base section being fixed to mandrel 54, and one end of a connecting rod 12 is connected to and supported in the center of a free end 11a. The other end of connecting rod 12 is connected to and supported in the center of free end 21b of operation lever 21.

Next, the functions of the components of the first embodiment of the present invention as shown in FIGS. 1 through 15 are described.

Figure 4:
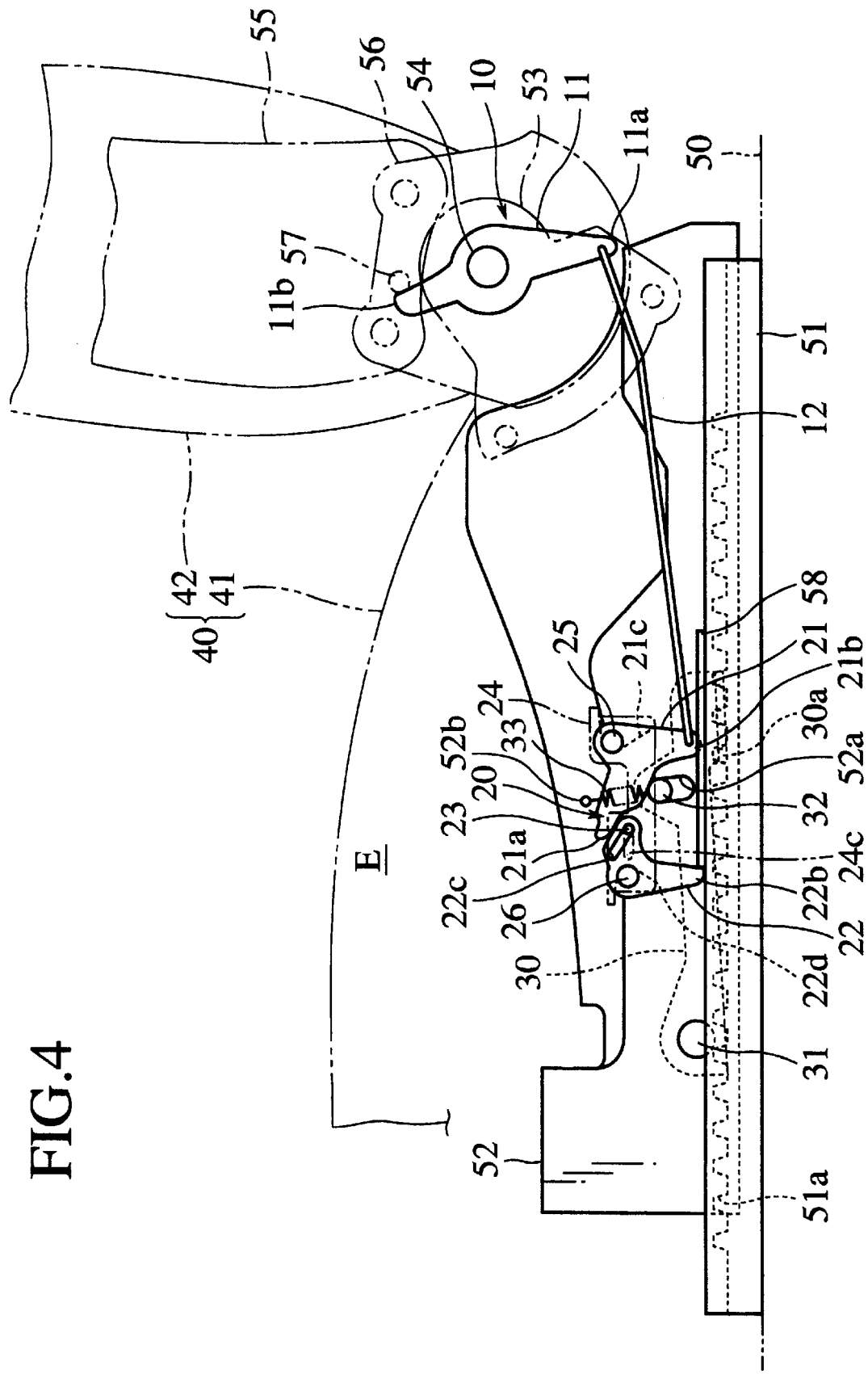
FIG. 4 is a side view of the seat sliding apparatus locked in a forward position from a neutral position of a vehicle seat.

The seat sliding apparatus E as shown in FIG. 4 is locked in a forward position from the neutral position of vehicle seat 40. In this position, engagement convex sections 30a of lock plate 30 are held in engagement with engagement notches 51a of lower rail 51 by the bias force of draft spring 33, and thus movement of vehicle seat 40 in a forward-and-backward direction is prevented. This is the locked position of the sliding seat apparatus E.

In addition, torsion coil spring 22d biases free end 22b of memory bracket 22 into a position where it can be engaged by memory lock releasing member 58 and memory holding pin 23 is brought into contact with the right end of slide hole 24c of substrate 24 so as to be positioned within the moving locus of free end 21a of operation lever 21.

Further, lock pin 32 is brought into forceful contact with operation lever 21 by the bias force of draft spring 33, and free end 21a of operation lever 21 is positioned above memory holding pin 23.

Figure 5:
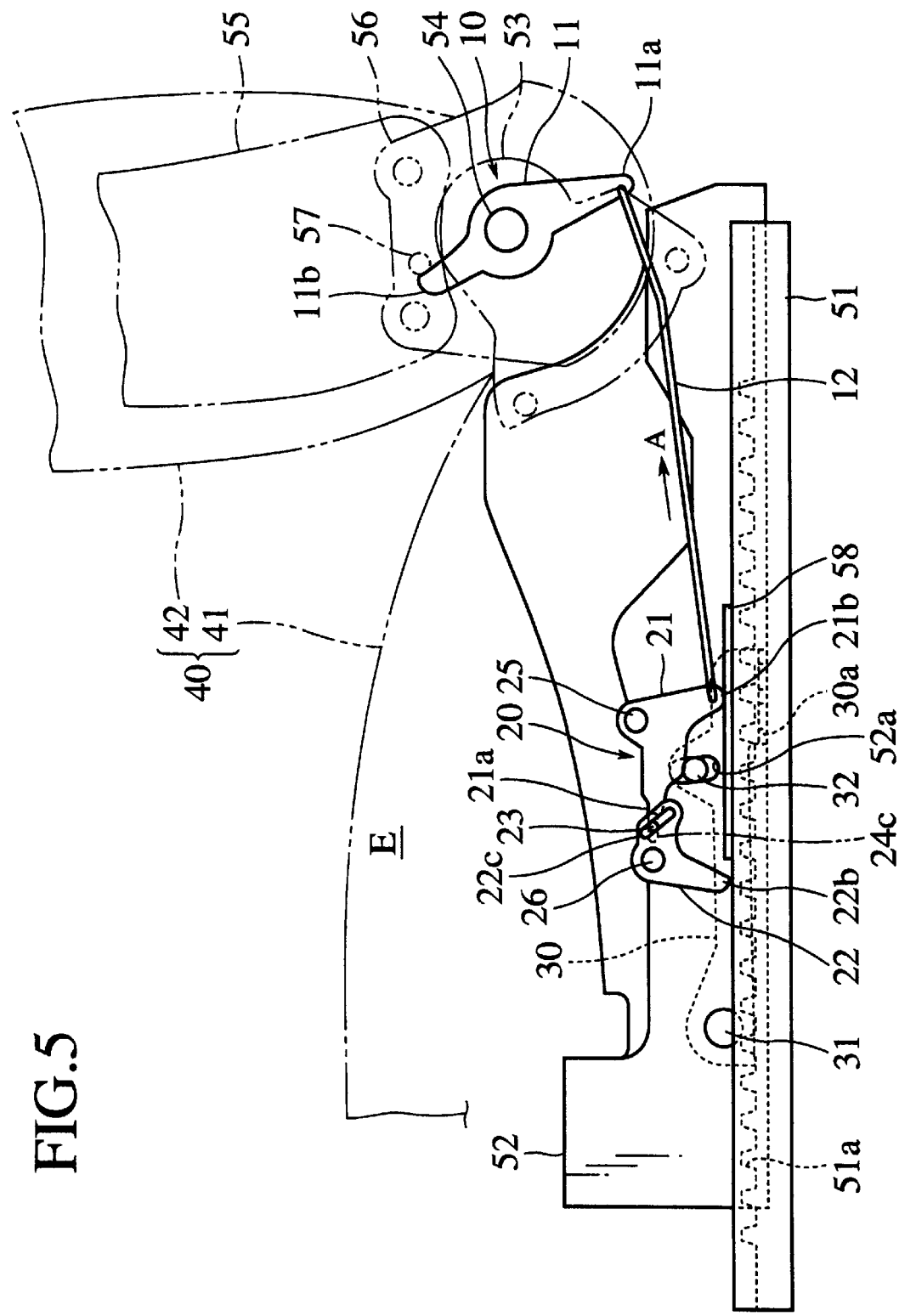
FIG. 5 is a side view of the vehicle seat in the position shown in FIG. 4 where a seat back of the vehicle seat is folded forward.

As shown in FIG. 5, when seat back 42 is folded forward from its position shown in FIG. 4, walk-in lever 11 is rotated in the counterclockwise direction by operation pin 57, connecting rod 12 is drawn in the direction of arrow A, and operation lever 21 rotates in the counterclockwise direction so as to press down lock pin 32. As a result, lock plate 30 rotates in the clockwise direction, and engagement of engagement convex portions 30a with engagement notches 51a of lower rail 51 is released. Thus, seat sliding apparatus E is in the unlocked position.

In addition, memory holding pin 23 is contracted by free end 21a of operation lever 21 and moved to the left in slide hole 24c, and this, in turn, rotates memory bracket 22 in the clockwise direction.

Figure 6:
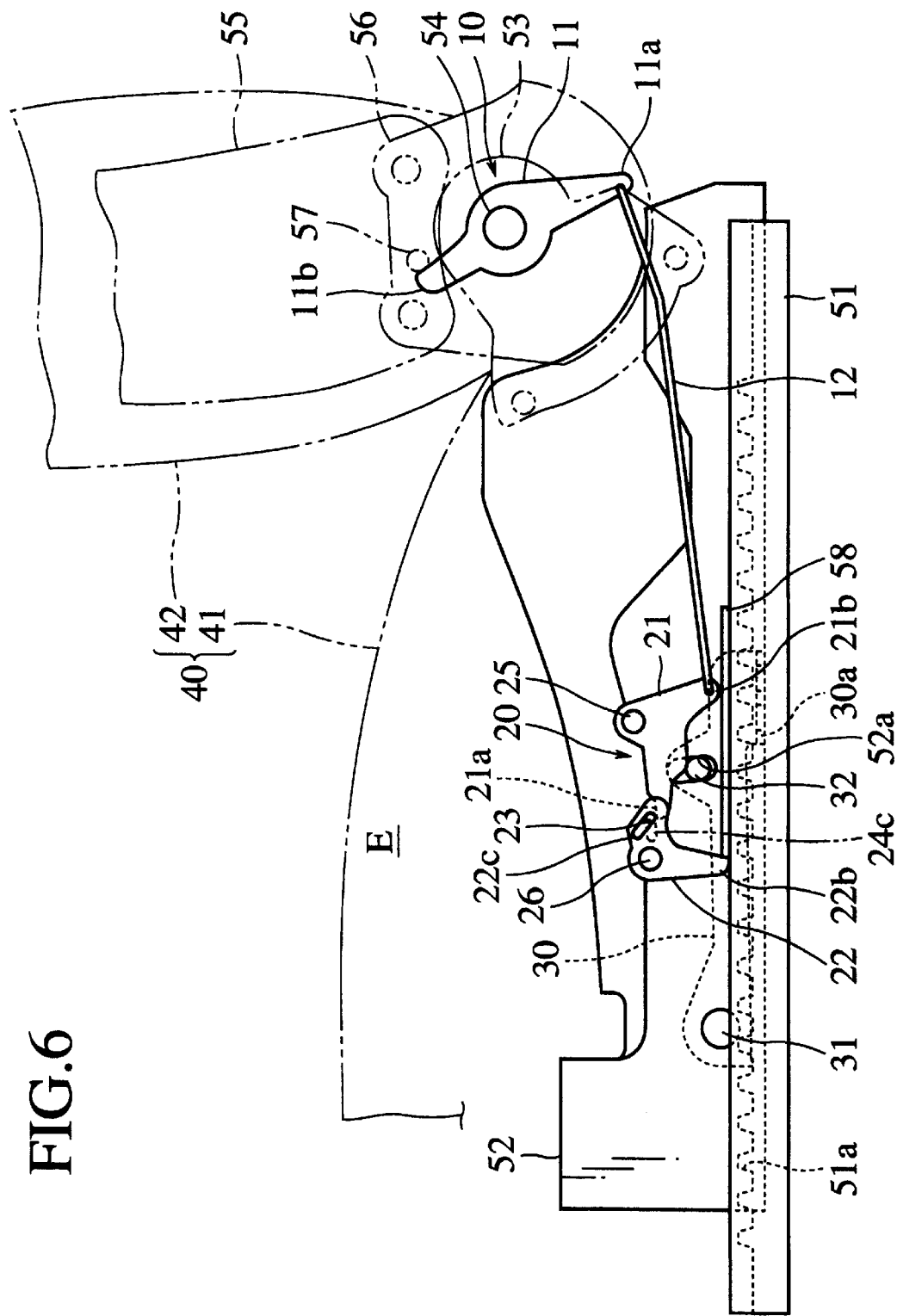
FIG. 6 is a side view of the vehicle seat shown in FIG. 5, with the seat back folded further forwarded.

When seat back 42 is further folded forward from the position shown in FIGS. 5 to the position shown in FIG. 6, operation lever 21 passes the position of memory holding pin 23, memory bracket 22 rotates in the counterclockwise direction due to the biasing force of torsion coil spring 22d and memory holding pin 23 moves to the right most position of slide holes 22c and 24c where it can be brought into contact with free end 21a of operation lever 21.

Figure 7:
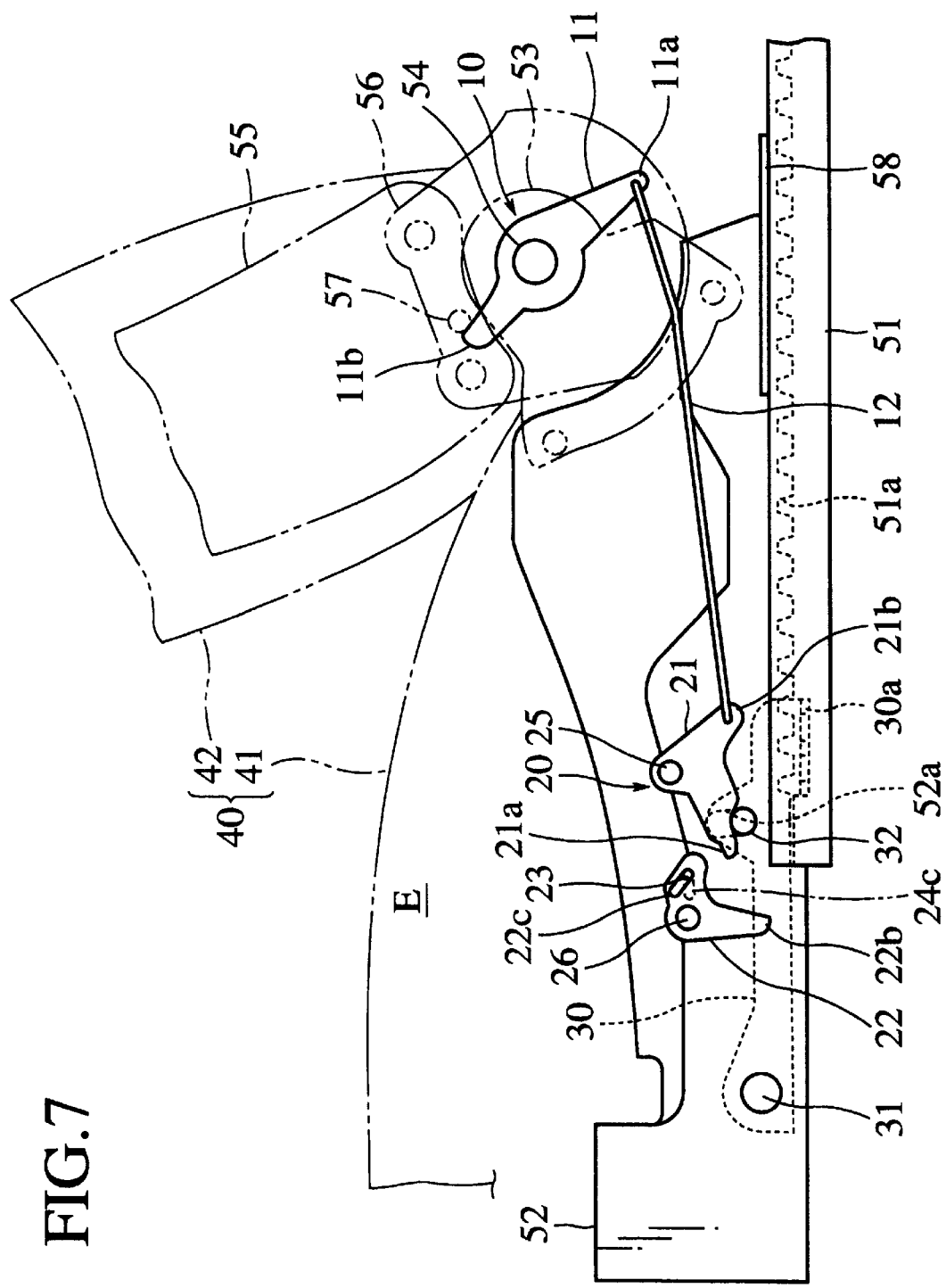
FIG. 7 is a side view of the seat sliding apparatus in a lock-off position.

When the seat sliding apparatus E is in the unlocked position, as shown in FIG. 7, the vehicle seat 40 moves to the most advanced position.

Figure 8:
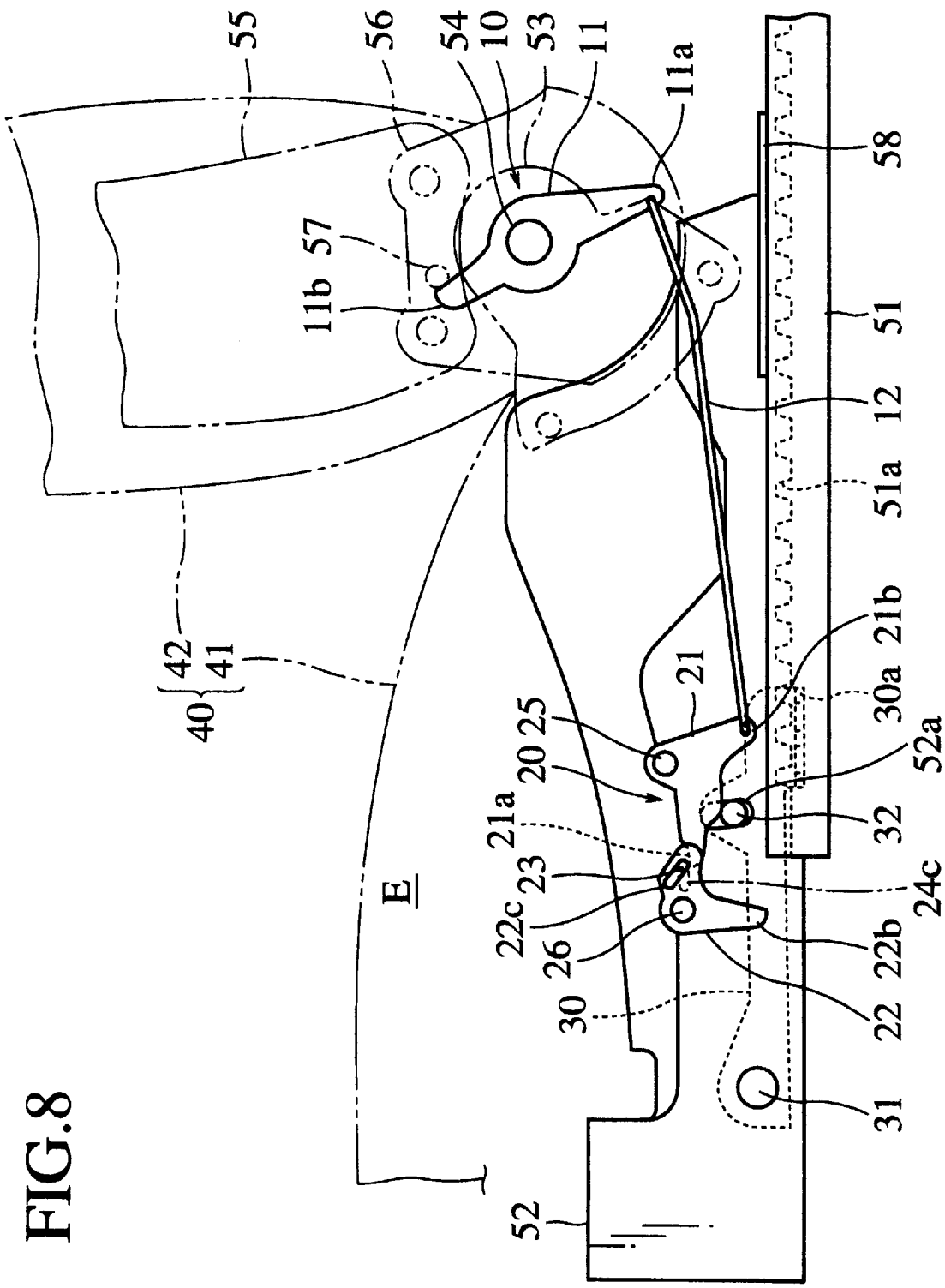
FIG. 8 is a side view of the vehicle seat shown in FIG. 7, with the seat back being raised.

As shown in FIG. 8, when the seat back 42 is moved backward from the position shown in FIG. 7, operation lever 21 rotates circularly in the clockwise direction due to the bias forces of draft spring 33 and torsion coil spring 21c, and free end 21a is in pressured engagement with memory holding pin 23. In this position, since engagement convex portions 30a of lock plate 30 are removed from engagement notches 51a, seat sliding apparatus E is held in the unlocked position.

Figure 9:
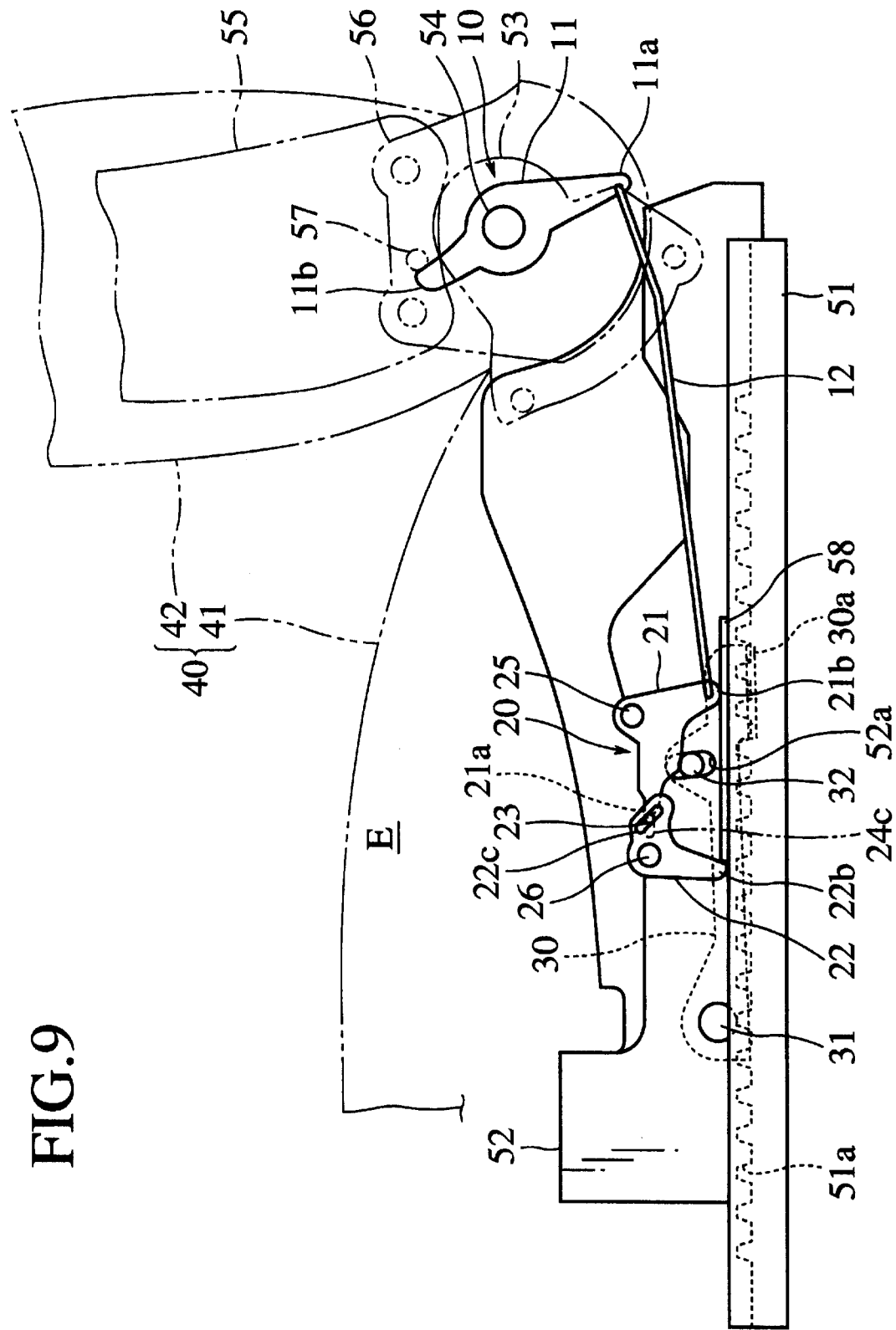
FIG. 9 is a side view showing the vehicle seat moved back to the vicinity of a neutral position.

As shown in FIG. 9, when vehicle seat 40 is moved backward from the position shown in FIG. 8 to the vicinity of the neutral position, free end 22b of memory bracket 22 is brought into contact with the left end of lock releasing member 58 so as to rotate in the clockwise direction, and accordingly memory holding pin 23 moves to the left in slide hole 24c. As a result, the engagement of memory holding pin 23 with free end 21a of operation lever 21 is released, and operation lever 21 rotates in the clockwise direction, and thus, lock plate 30 rotates in the counterclockwise direction. Thus seat sliding apparatus E is returned to the locked position with vehicle seat 40 in the neutral position.

As mentioned above, even if seat back 42 is raised after seat back 42 is folded forward and vehicle seat 40 is moved forward seat sliding apparatus E can be maintained in the unlocked position, so vehicle seat 40 can be moved easily.

Figure 10:
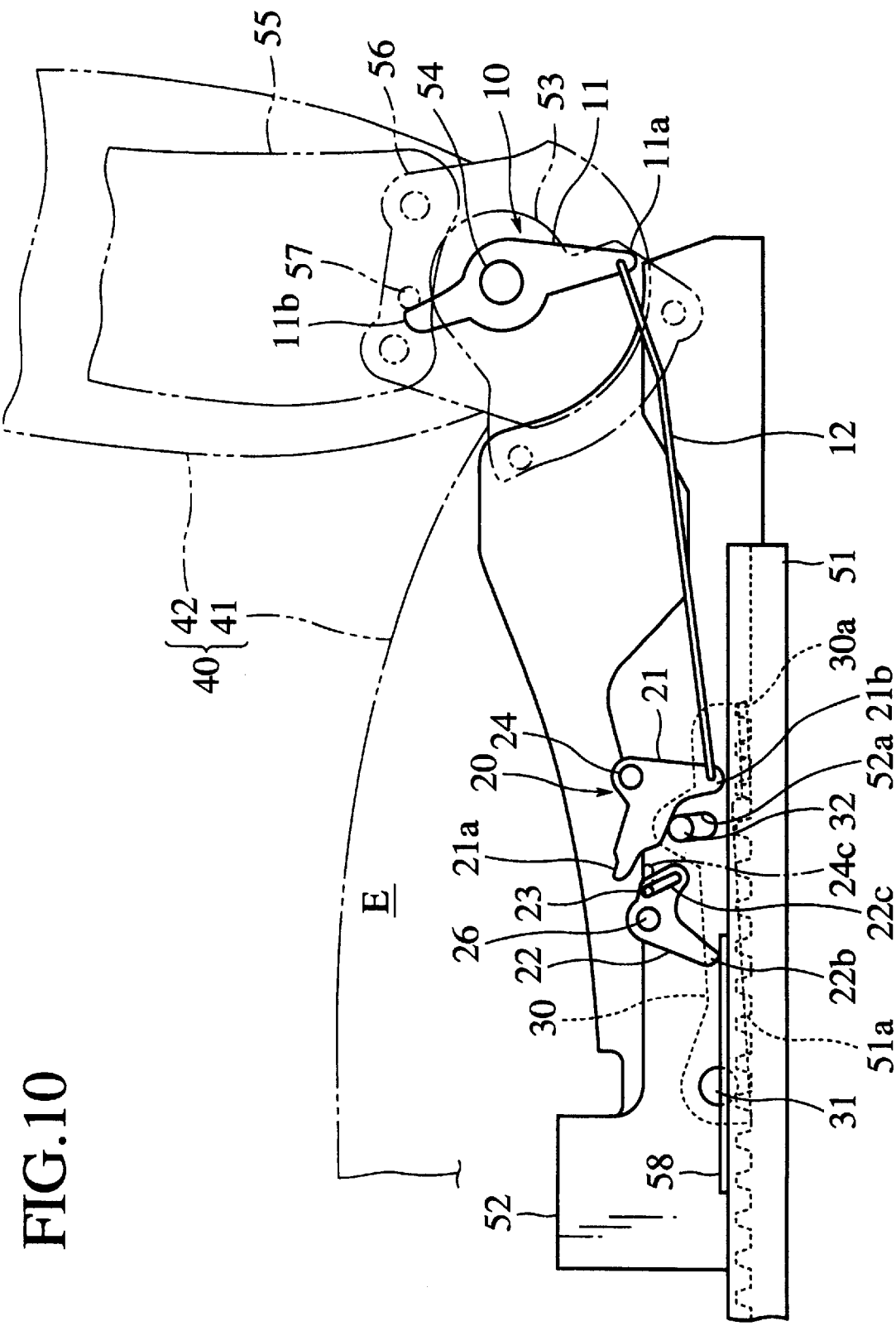
FIG. 10 is a side view of the seat sliding apparatus locked in a backward position from the neutral position.

In FIG. 10, seat sliding apparatus E is locked in a backward position from the neutral position of vehicle seat 40. In this position, just as FIG. 4, the engagement of engagement convex portions 30a of lock plate 30 with engagement notches 51a prevents movement of vehicle seat 40 in the forward-and-backward direction.

In this position, free end 22b of memory bracket 22 is engaged with an upper surface of memory lock releasing member 58 due to the biasing force of torsion coil spring 22d, and memory holding pin 23 is brought into contact with the left end of slide hole 24c of substrate 24. Further, free end 21a of operation lever 21 is above memory holding pin 23, in a position shifted away from memory holding pin 23.

Figure 11:
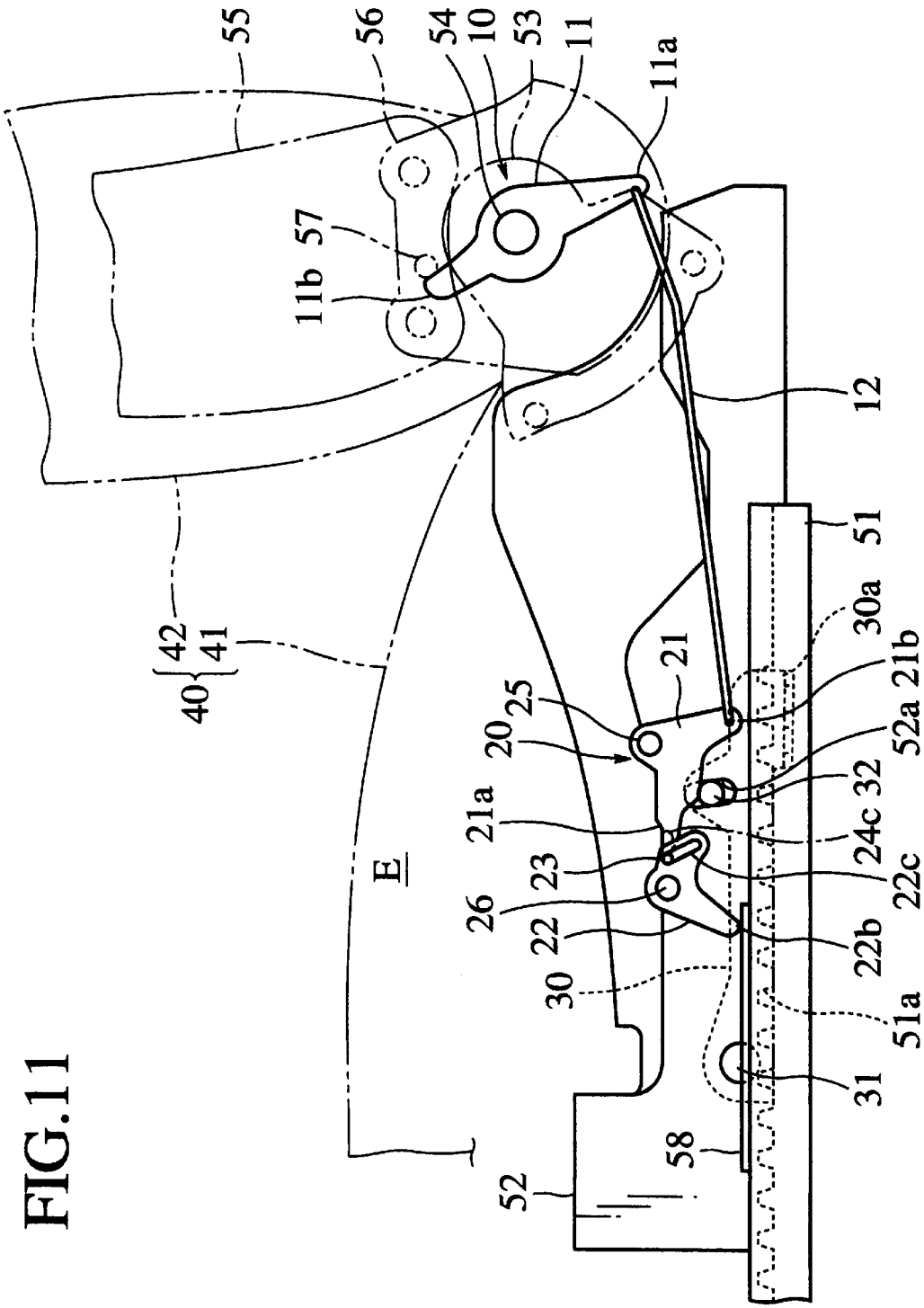
FIG. 11 is a side view of the vehicle seat shown in FIG. 10 after the seat back of the vehicle seat is folded forward.

As shown in FIG. 11, when seat back 42 is folded forward from the position shown in FIG. 10, similarly to the situation shown in FIG. 5, seat sliding apparatus E is in the unlocked position, but since memory holding pin 23 is on the left side of slide hole 24c in this position, free end 21a of operation lever 21 rotates without being brought into contact with memory holding pin 23, and memory holding pin 23 is held on the left side of slide hole 24c of substrate 24.

Figure 12:
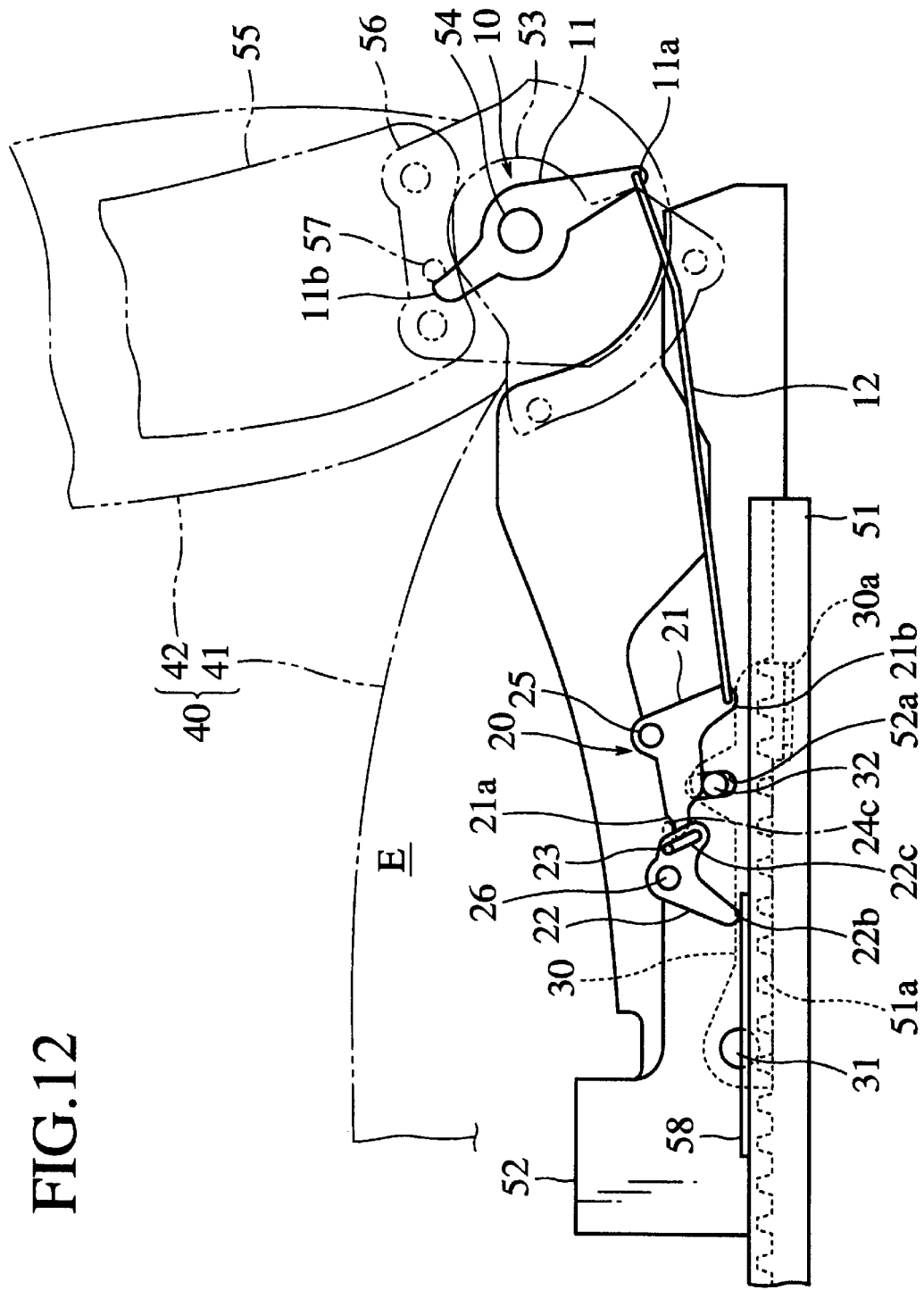
FIG. 12 is a side view of the vehicle seat shown in FIG. 11 when the seat back is folded further forward.

When seat back 42 is folded further forward from the position shown in FIG. 11, as shown in FIG. 12, free end 21a of operation lever 21 moves below memory holding pin 23. When the seat back 42 is moved backward in this position, free end 21a of operation lever 21 rotates in the clockwise direction without being brought into contact with memory holding pin 23, and the seat sliding apparatus E is in the locked position as shown in FIG. 10.

Figure 13:
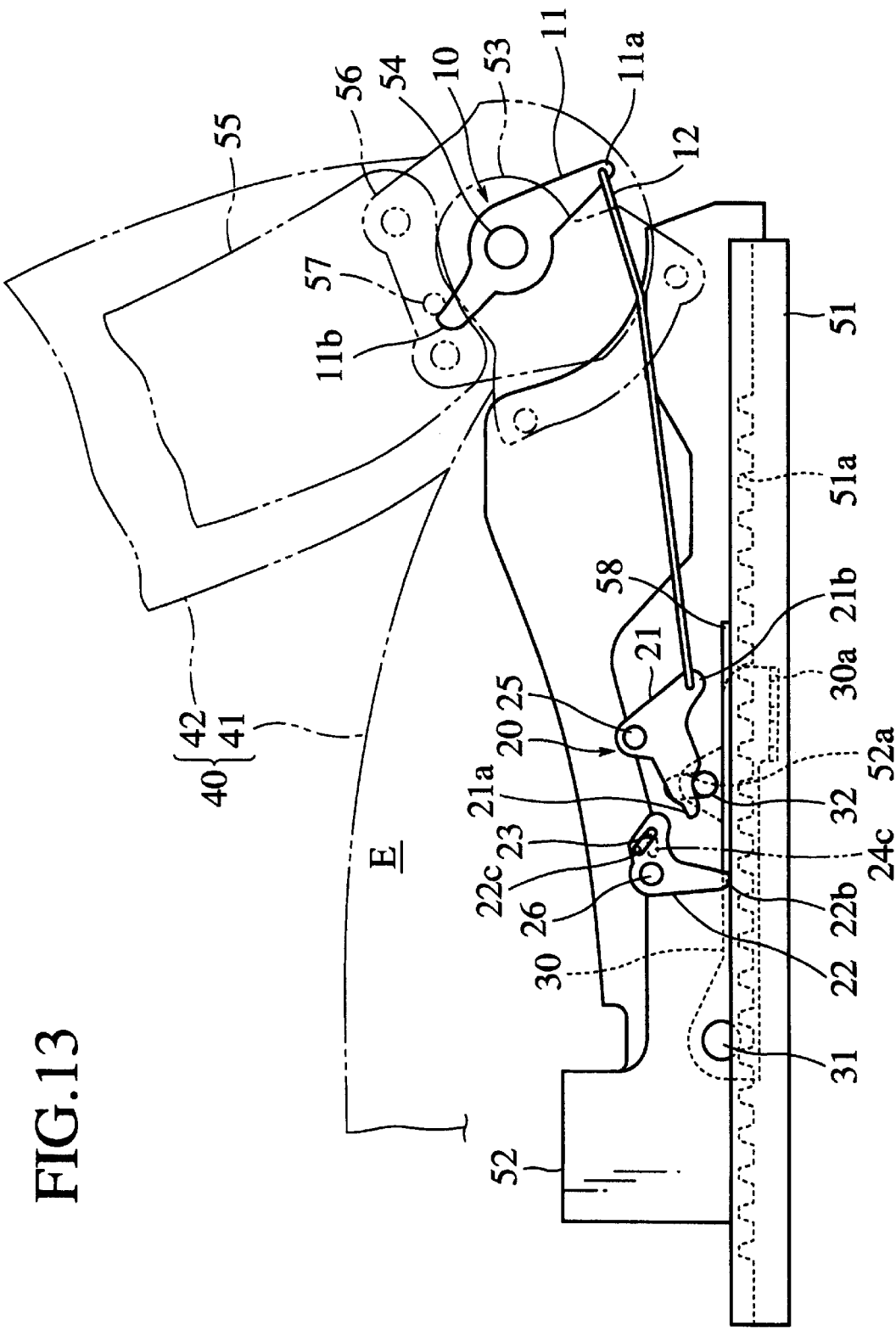
FIG. 13 is a side view of the seat sliding apparatus in the lock-off state.

When the seat sliding apparatus E is in the unlocked position, vehicle seat 40 advances up to the position shown in FIG. 13, and the engagement of free end 22b of memory bracket 22 with the upper surface of memory lock releasing member 58 is released and simultaneously memory bracket 22 rotates in the counter-clockwise direction. As a result, memory holding pin 23 moves to a position where it is brought into contact with the right side of slide hole 24c.

Figure 14:
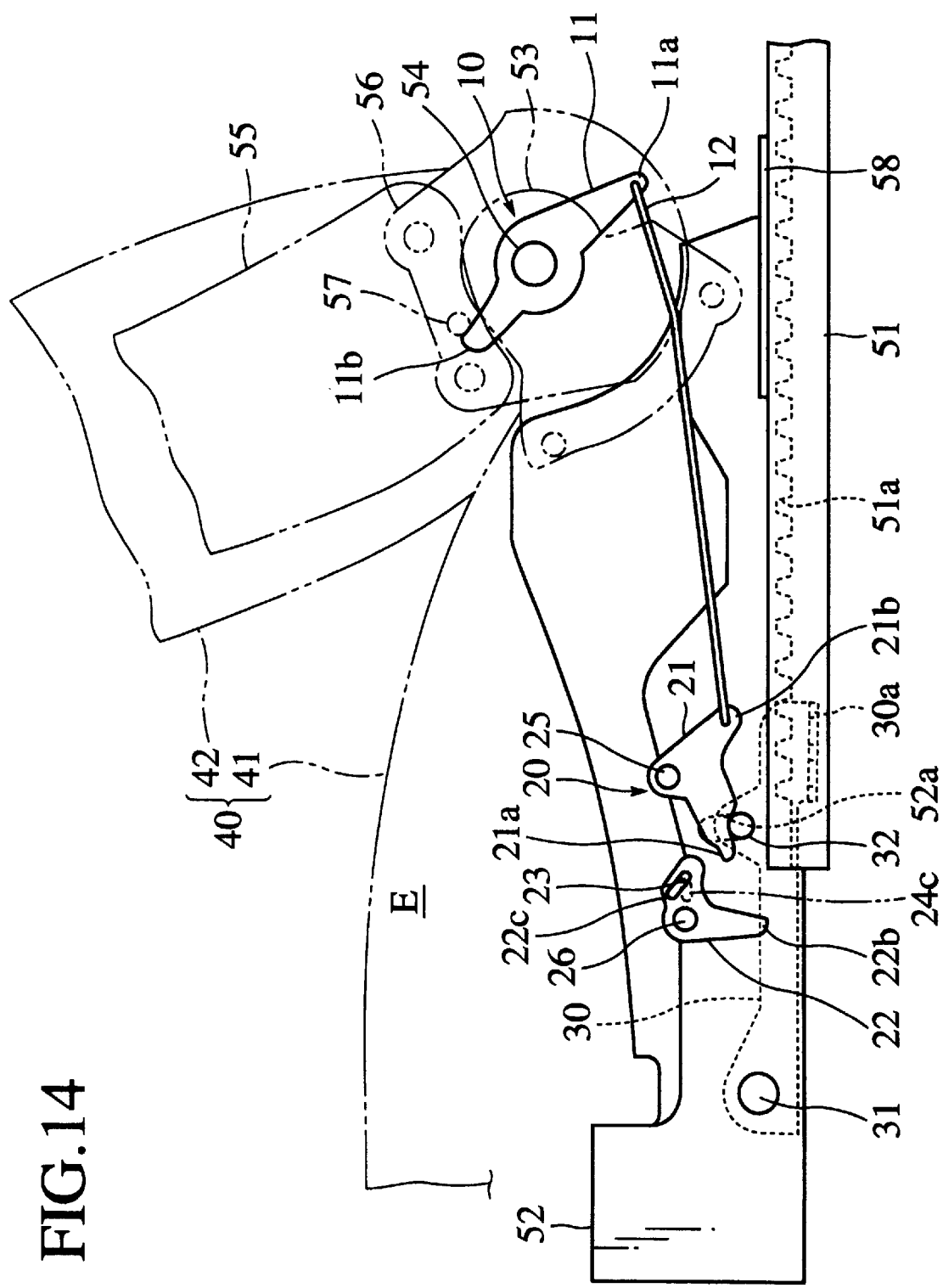
FIG. 14 is a side view of the vehicle seat of the seat sliding apparatus moved to a most advanced position.

FIG. 14 shows vehicle seat 40 moved to the most advanced position from the position shown in FIG. 13. As shown in FIG. 15, when vehicle seat 40 is moved back to the vicinity of the neutral position from its most advanced position without raising seat back 42, free end 22b of memory bracket 22 is brought into contact with the left end surface of memory lock releasing member 58 and then with the upper surface of memory lock releasing member 58. Accordingly, memory bracket 22 rotates in the clockwise direction and moves to a position where memory holding pin 23 is brought into contact with the left end of slide hole 24c.

Thereafter, when seat back 42 is raised in this position, free end 21a of operation lever 21 rotates in the clockwise direction without being engaged with memory holding pin 23, and lock pin 32 is raised. Then, engagement convex portions 30a of lock plate 30 are engaged with engagement notches 51a of lower rail 51 so that the seat sliding apparatus E is in the locked position.

According to the above-mentioned first embodiment of the present invention operation lever 21, memory bracket 22 and memory holding pin 23 are mounted to substrate 24. As a result, memory mechanism section 20 is unified, and the united memory mechanism section 20 is mounted to upper rail 52, so memory mechanism section 20 can be easily assembled, and the assembling is greatly improved.

In addition, since collar sections 25a and 26a are formed respectively to axis fixing pin 25 of operation lever 21 and axis fixing pin 26 of memory bracket 22, operation lever 21 and memory bracket 22 can be easily positioned.

Furthermore, since memory holding pin 23 for locking and unlocking operation lever 21 is moved between the locked side and unlocked side of operation lever 21 by cooperation of the slide holes 22c and 24c, provided respectively by memory bracket 22 and substrate 24, thus operation lever 21 can be locked and unlocked by a simple arrangement.

FIG. 16 is top plan view, similar to FIG. 3 of a second embodiment of the present invention. In FIG. 16, elements which are the same as those in the first embodiment, shown in FIGS. 1 through 15, are represented by the same reference numerals, and the description thereof is omitted.

In the second embodiment, a space 20a is provided so that the components of memory mechanism section 20 can be arranged between a first substrate 27 and a second substrate 28. Operation lever 21 is fixed to substrates 27 and 28 by axis fixing pin 25, and memory bracket 22 is fixed to substrates 27 and 28 by axis fixing pin 26. Memory holding pin 23 extends through a pair of slide holes 27a and 28a provided in substrates 27 and 28 and through slide hole 22c in memory bracket 22 so that memory mechanism section 20 is unified. Slide holes 27a and 28a are aligned with each other and have a configuration and function like slide hole 24c of the embodiment shown in FIGS. 1 through 15. Substrates 27 and 28 are fixed to upper rail 52 so that united memory mechanism section 20 can be mounted to upper rail 52.

A pair of bearings 27b and 28b support a pair of small diameter sections 25c formed on each end of axis fixing pin 25. A pair of bearings 27c and 28c support a pair of small diameter sections 26c formed on each end of axis fixing pin 26. Bearings 27b, 27c, 28b and 28c are formed on substrates 27 and 28 by a burring process. Spacer 26b is provided on axis fixing pin 26 between substrate 28 and memory bracket 22. An engagement section 27e for engagement with torsion coil spring 21c and an engagement section 27f for engagement with torsion coil spring 22d are formed on substrate 27.

Mounting sections 27*d* and 28*d* are formed respectively on substrates 27 and 28. Mounting sections 27*d* and 28*d* are polymerized so as to be fixed to upper rail 52 by a caulking pin 20*b*. Thus, memory mechanism section 20 is mounted to upper rail 52.

The other arrangements and functions are the same as those explained in the first embodiment shown in FIGS. 1 through 15.

While preferred embodiments of the present invention have been described using specific terms, such description is for illustrative purposes, and it is to be understood that changes and variations may be made without departing from the spirit or scope of the following claims.

What is claimed is:

1. A seat sliding apparatus comprising:

a lower rail adapted to be mountable to a vehicle floor;

an upper rail slidably received on said lower rail; a memory mechanism section;

a lock plate for releasably locking said upper rail to said lower rail; and a walk-in mechanism section for locking and unlocking movement of a vehicle seat in a forward-and-backward direction through operation of said memory mechanism section and said lock plate, wherein said memory mechanism section is arranged in a space formed between a first substrate and a second substrate and said memory mechanism further comprises;

an operation lever for operating said lock plate, said operation lever rotatably mounted between said first and said second substrates on an axis fixing pin fixed to said first and said second substrates;

a memory bracket holding said lock member in an unlocked position, said memory bracket rotatably mounted between said first and said second substrates on an axis fixing pin fixed to said first and second substrates adjacent a free end of said operation lever;

a memory holding pin for contacting and restraining said free end of said operation lever, said memory holding pin arranged to contact a portion of said free end of said operation lever and to extend through said memory bracket; and said memory holding pin extending through a slide hole in each of said first and said second substrates and through a slide hole in said memory bracket, so that said memory mechanism section is united, said first and said second substrates fixed to said upper rail.

2. The seat sliding apparatus according to claim 1, wherein said slide hole in said at least one substrate between the first and second substrates is oriented in the direction of a line connecting said axis fixing pin of said operation lever to said axis fixing pin of said memory bracket; and said slide hole in said memory bracket is oriented on a slant relative to said line so that said memory holding pin can be moved to an unlocked side of said slide hole in said at least one substrate by rotary movement of said memory bracket.

3. The seat sliding apparatus according claim 1, wherein said slide holes in said first and said second substrates are oriented in a direction of a line connecting said axis fixing pin of said operation lever to said axis fixing pin of said memory bracket; and said slide hole in said memory bracket is oriented on a slant relative to said line so that said memory holding pin can be moved to an unlocked side of said slide holes in said first and second substrates by rotary movement of said memory bracket.

* * * * *